(12) United States Patent
Piskoti et al.

(10) Patent No.: US 6,939,524 B1
(45) Date of Patent: Sep. 6, 2005

(54) CARBON BASED THIRTY SIX ATOM SPHERES

(75) Inventors: Charles R. Piskoti, Fenton, MI (US); Alex K. Zettl, Kensington, CA (US); Marvin L. Cohen, Piedmont, CA (US); Michel Cote, Cambridge (GB); Jeffrey C. Grossman, Berkeley, CA (US); Steven G. Louie, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 753 days.

(21) Appl. No.: 09/518,989

(22) Filed: Mar. 3, 2000

Related U.S. Application Data

(60) Provisional application No. 60/123,112, filed on Mar. 5, 1999.

(51) Int. Cl.$^7$ .............................................. C01B 31/00
(52) U.S. Cl. .............................. 423/445 B; 977/DIG. 1
(58) Field of Search .................................... 723/445 B

(56) References Cited

OTHER PUBLICATIONS

Stankevich, I.V. et al., Polyhodral Carbon Clusters $C_{36+12n}$ ($n \geq 0$) And Their Hydrocarbon Analogs as Predecessors of (6,0)-Tubular Structures' Modular Materials vol. 10 pp. 169-174 (1998).*

Service, 'New Fullerence Rounds out the Family' in *Sience* vol. 280 #5372 p. 2044, Jun. 1998.*

\* cited by examiner

*Primary Examiner*—Stuart Hendrickson
(74) *Attorney, Agent, or Firm*—Charles R. Nold; Berkeley National Laboratory

(57) ABSTRACT

A solid phase or form of carbon is based on fullerenes with thirty six carbon atoms ($C_{36}$). The $C_{36}$ structure with $D_{6h}$ symmetry is one of the two most energetically favorable, and is conducive to forming a periodic system. The lowest energy crystal is a highly bonded network of hexagonal planes of $C_{36}$ subunits with AB stacking. The $C_{36}$ solid is not a purely van der Waals solid, but has covalent-like bonding, leading to a solid with enhanced structural rigidity. The solid $C_{36}$ material is made by synthesizing and selecting out $C_{36}$ fullerenes in relatively large quantities. A $C_{36}$ rich fullerene soot is produced in a helium environment arc discharge chamber by operating at an optimum helium pressure (400 torr). The $C_{36}$ is separated from the soot by a two step process. The soot is first treated with a first solvent, e.g. toluene, to remove the higher order fullerenes but leave the $C_{36}$. The soot is then treated with a second solvent, e.g. pyridine, which is more polarizable than the first solvent used for the larger fullerenes. The second solvent extracts the $C_{36}$ from the soot. Thin films and powders can then be produced from the extracted $C_{36}$. Other materials are based on $C_{36}$ fullerenes, providing for different properties.

10 Claims, 9 Drawing Sheets

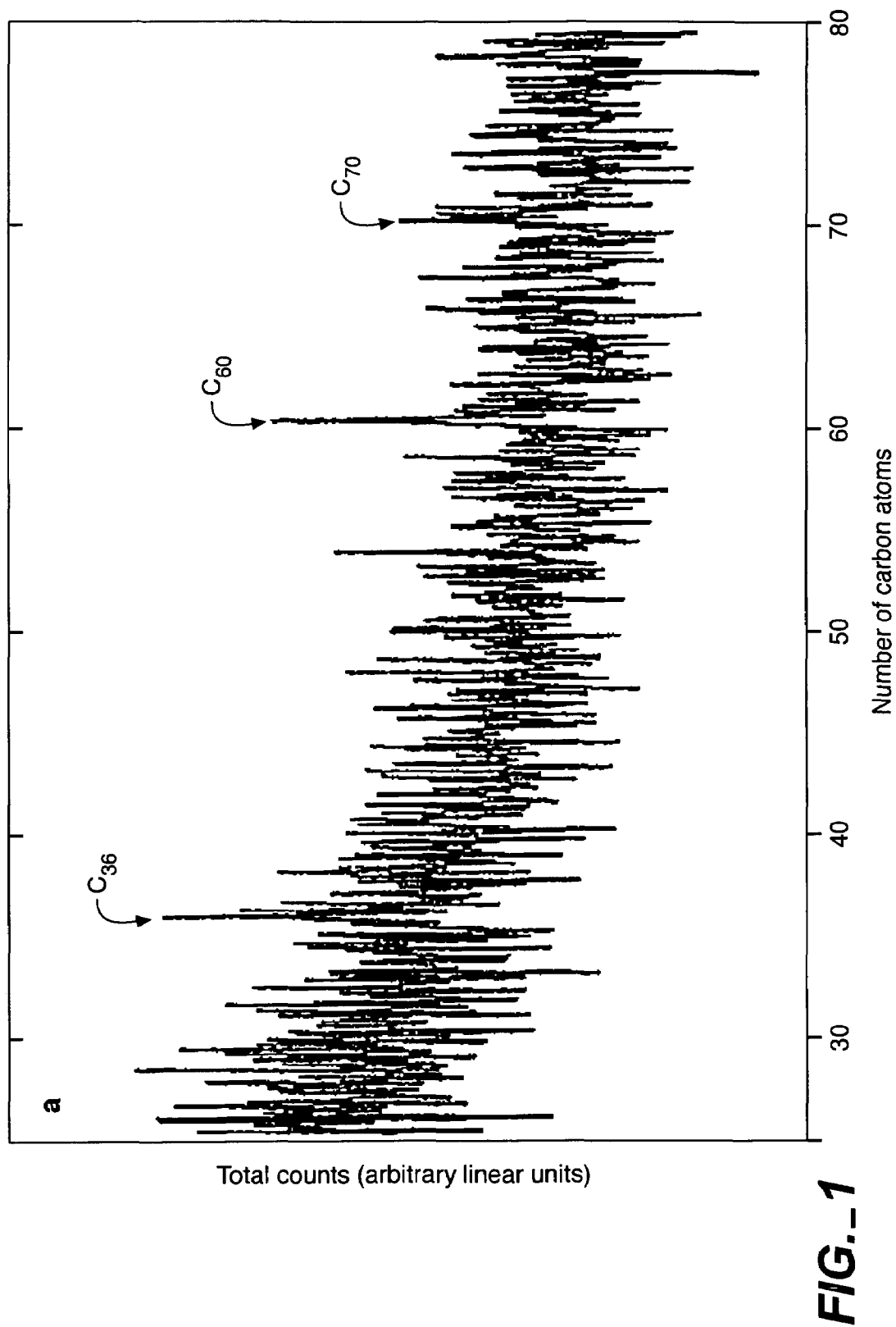
FIG._1

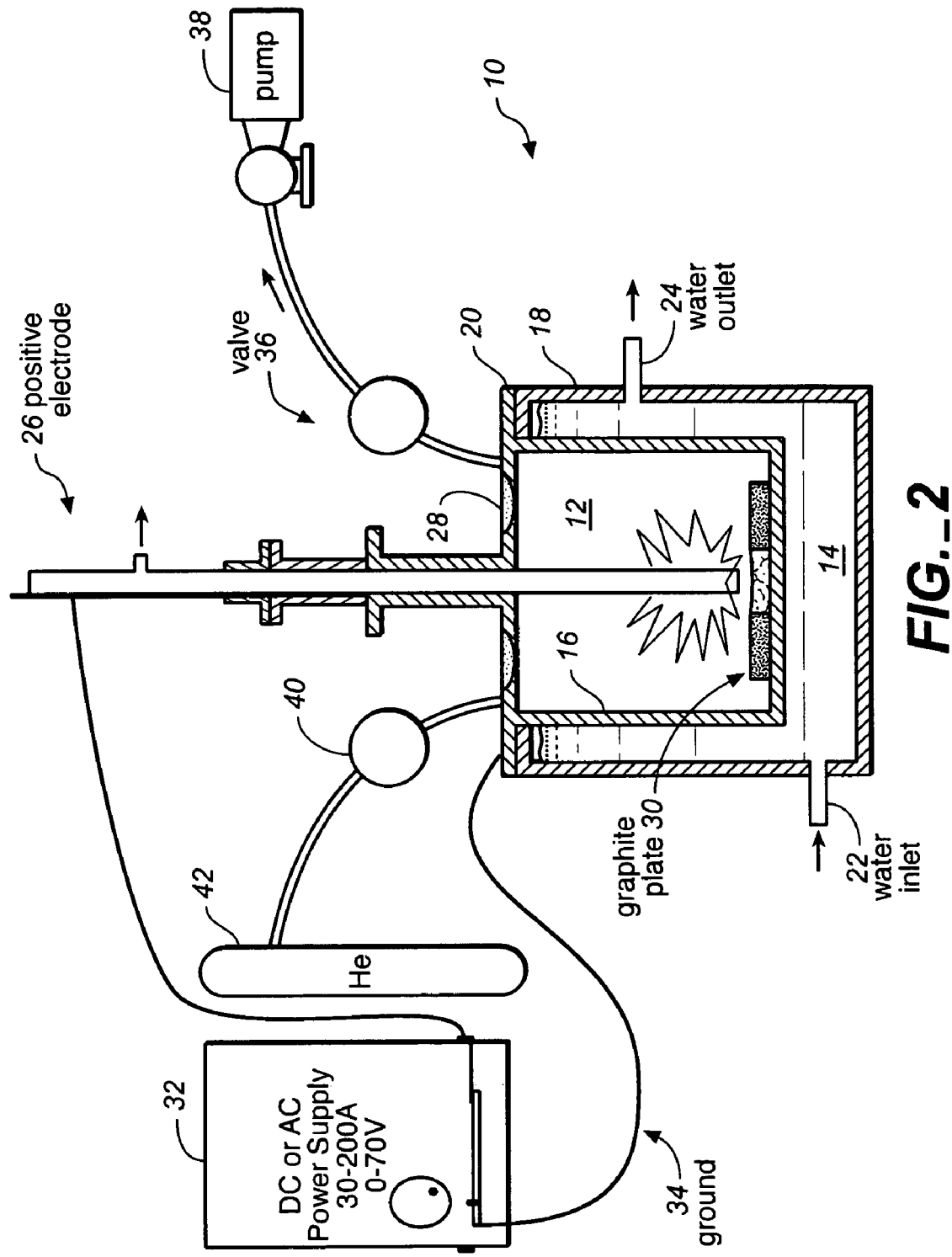
FIG._2

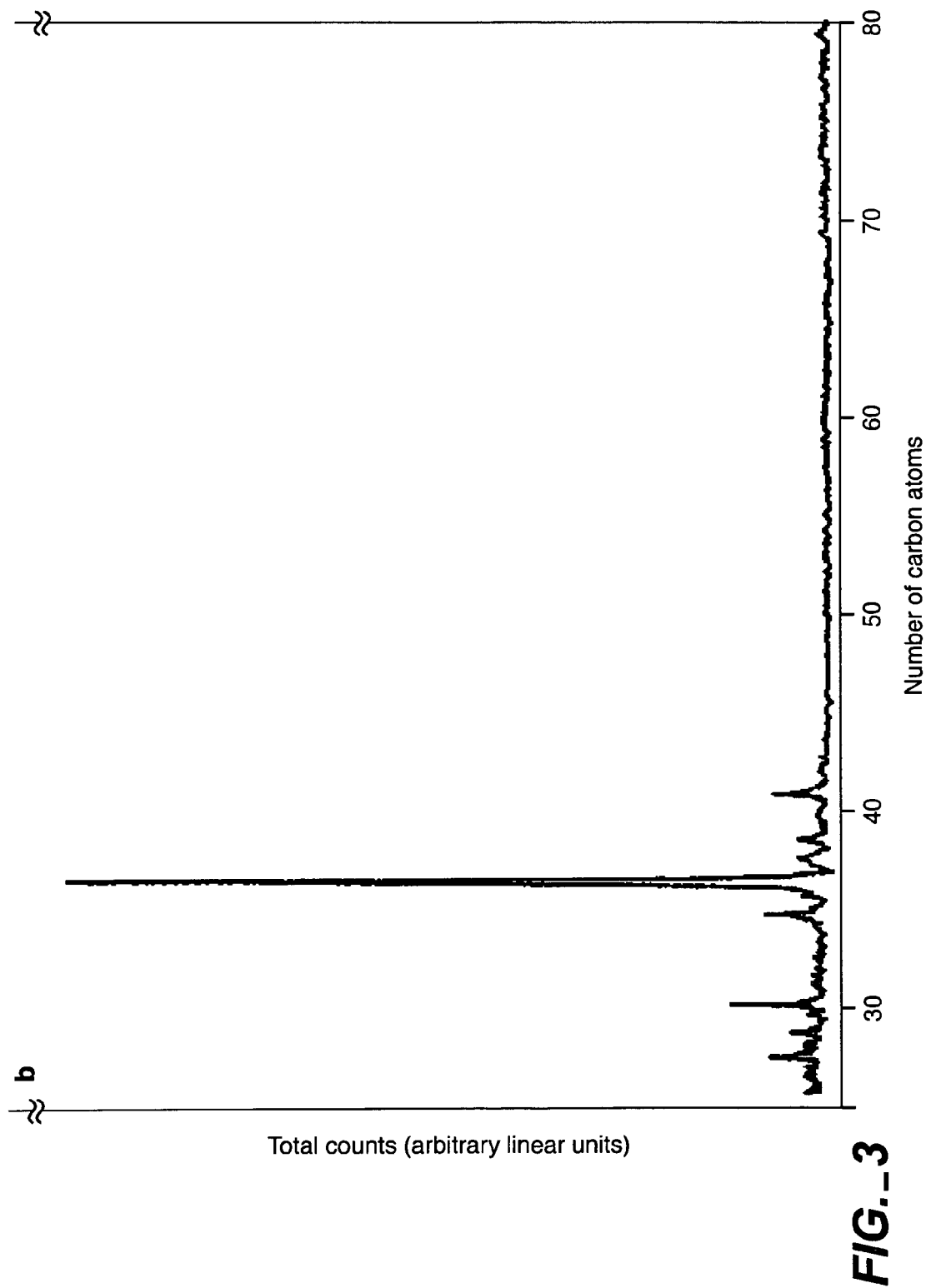
FIG._3

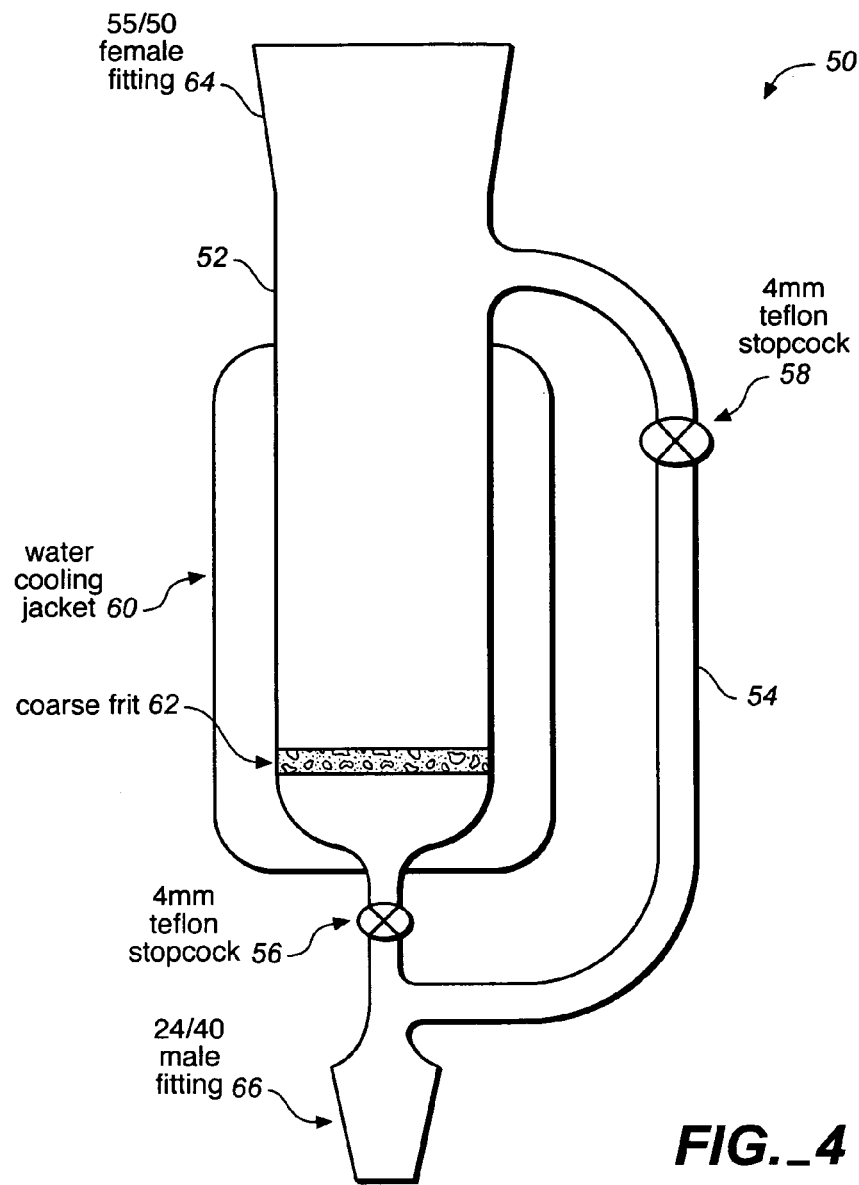
FIG._4
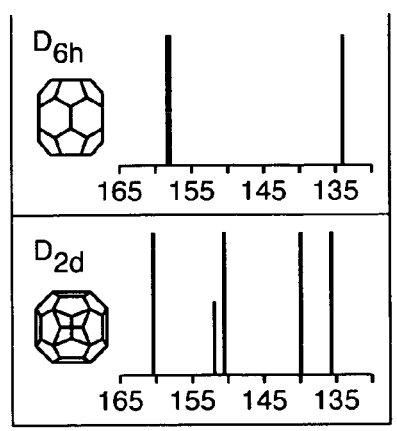
FIG._5A

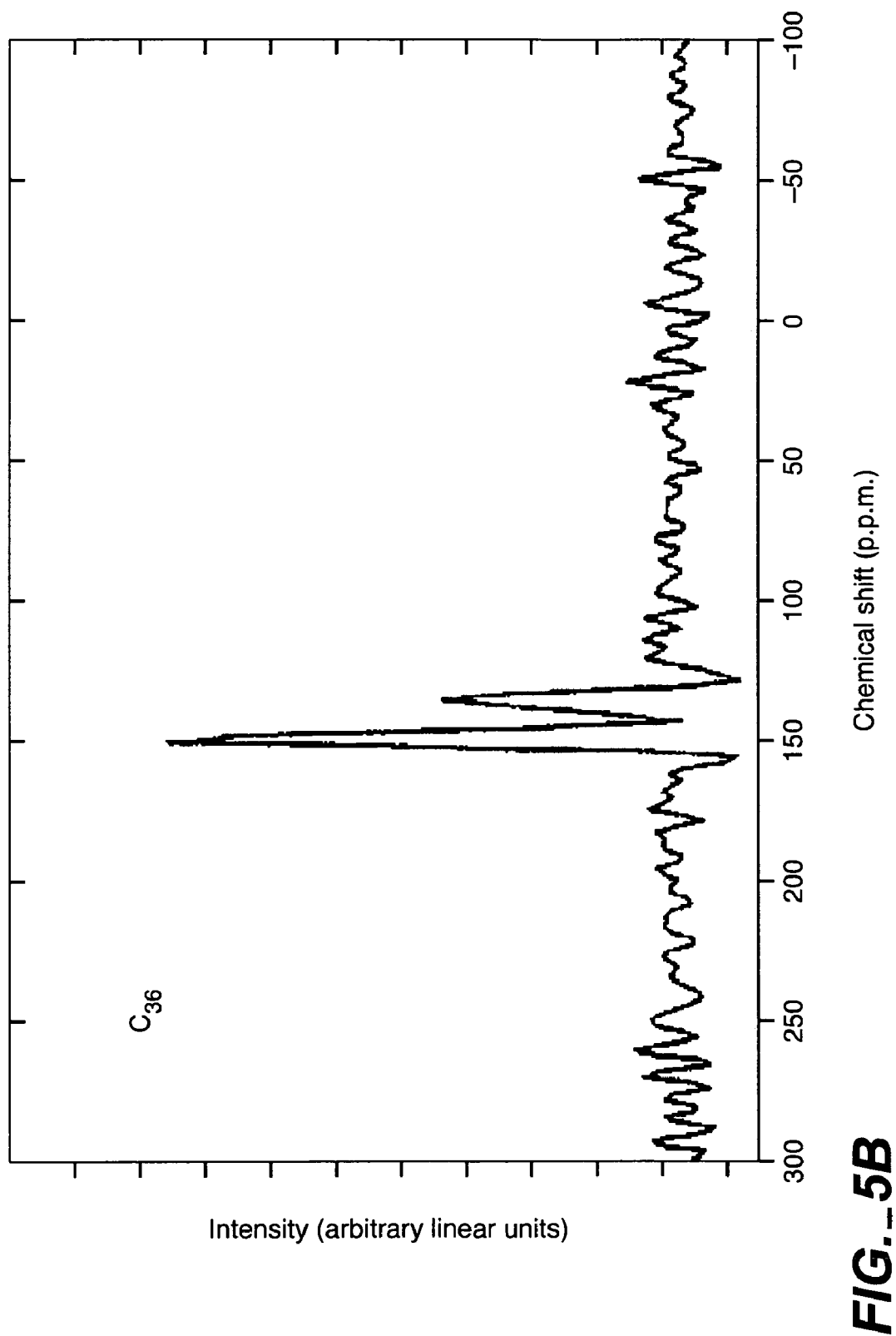
FIG._5B

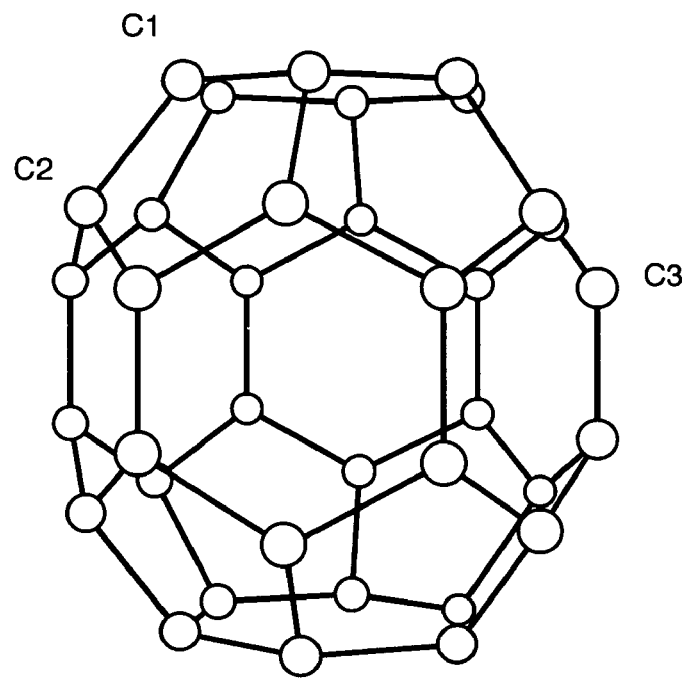
FIG._6A
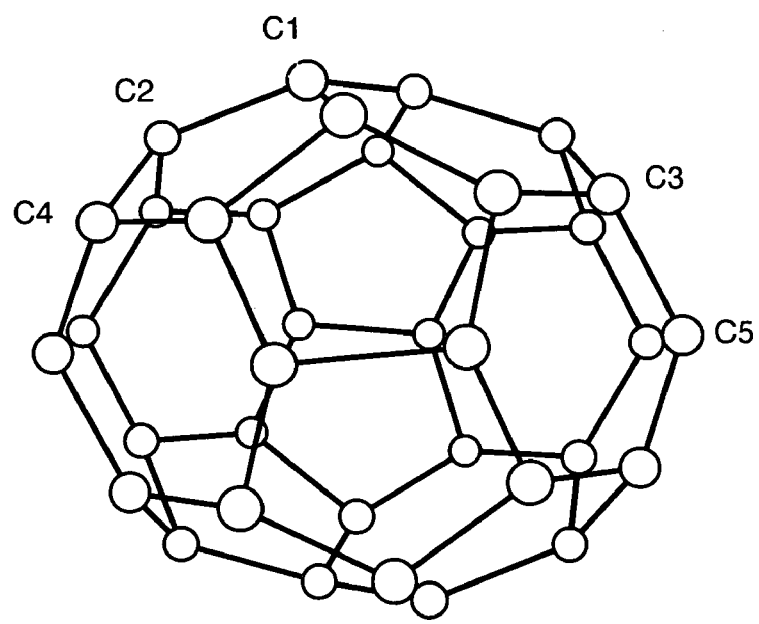
FIG._6B

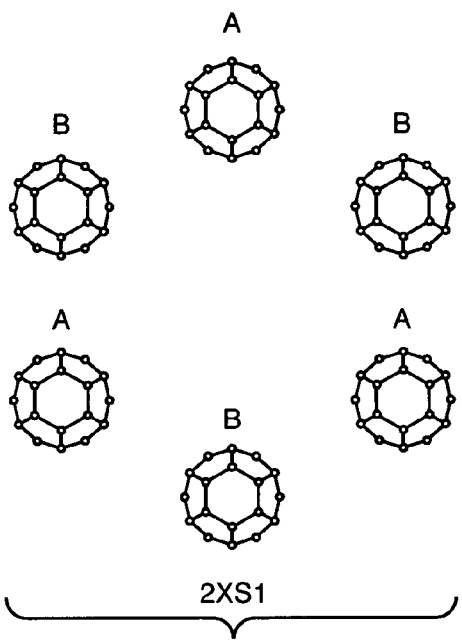
2XS1
FIG._7A
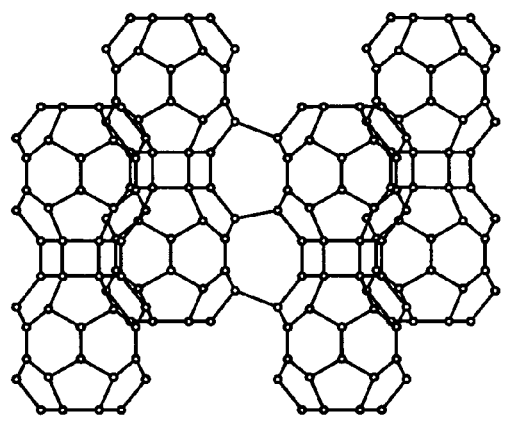
S1–AB
FIG._7B
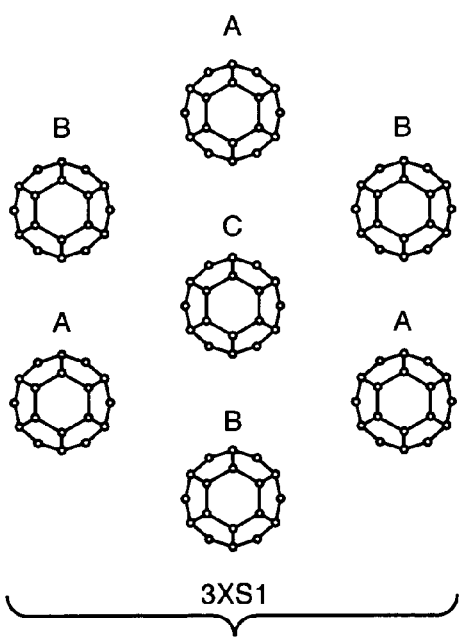
3XS1
FIG._7C
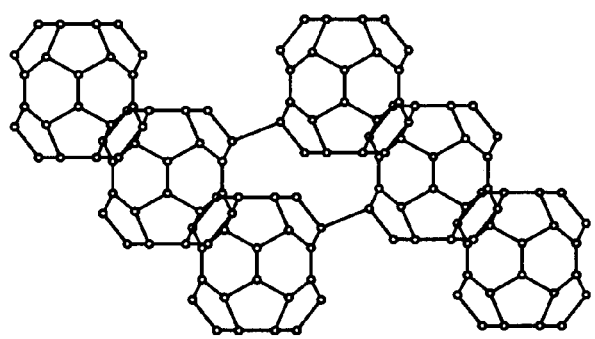
S1–ABC
FIG._7D

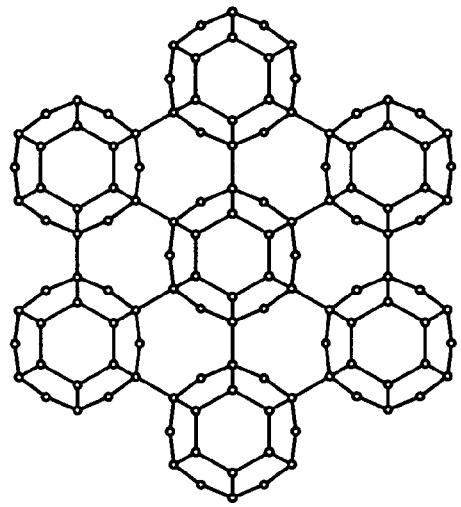
S2
FIG._8A
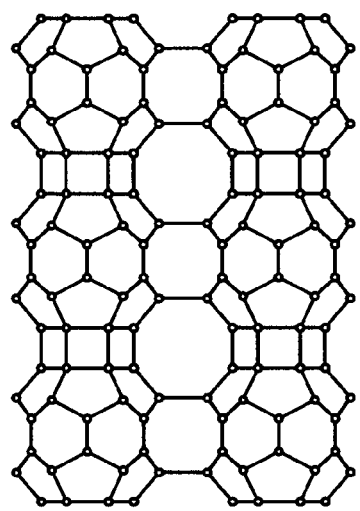
S2-AA
FIG._8B
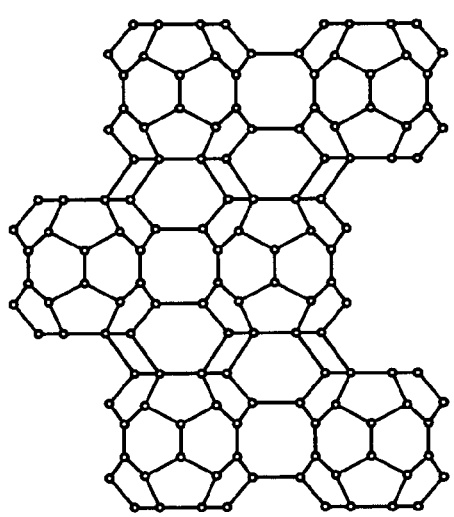
S2-AB
FIG._8C
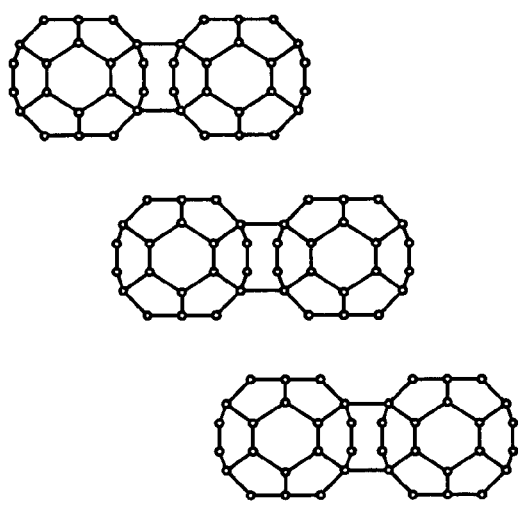
S2-ABC
FIG._8D

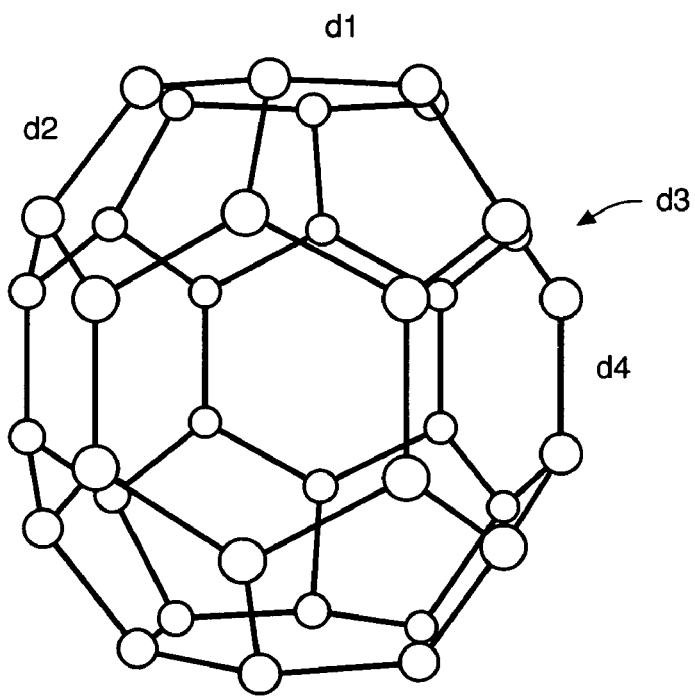
FIG._9A
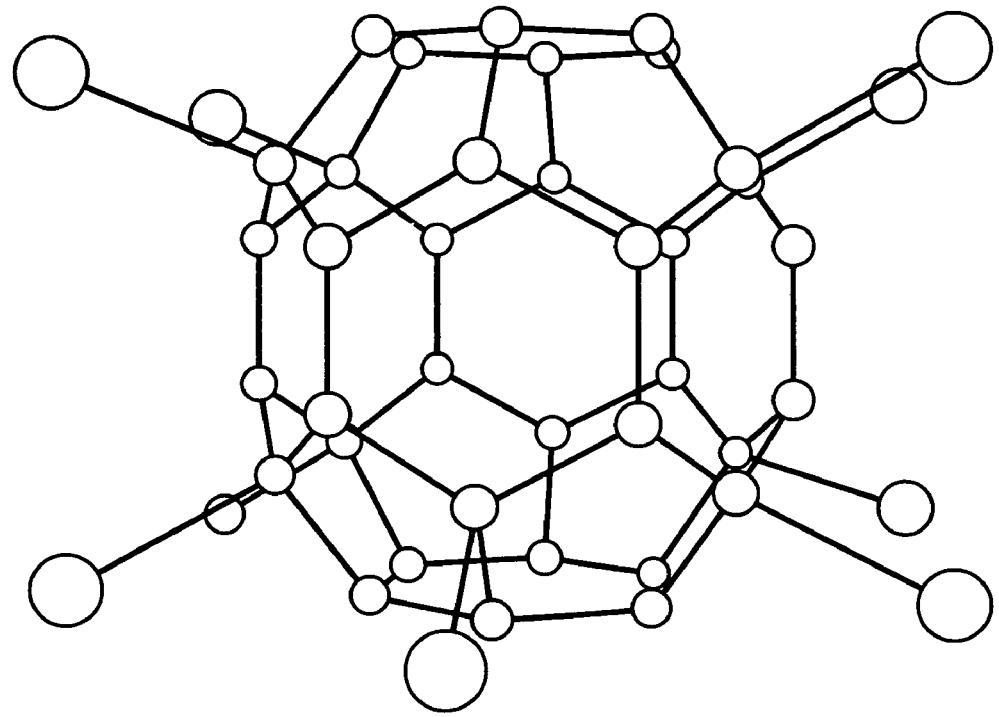
FIG._9B

CARBON BASED THIRTY SIX ATOM SPHERES

RELATED APPLICATIONS

This application claims priority of Provisional Application Ser. No. 60/123,112 filed Mar. 5, 1999 which is herein incorporated by reference.

GOVERNMENT RIGHTS

The United States Government has rights in this invention pursuant to Contract No. DE-AC03-76SF00098 between the United States Department of Energy and the University of California.

BACKGROUND OF THE INVENTION

The invention relates to carbon spheres or fullerenes based on thirty six carbon atoms, and more particularly to solid state materials formed of these fullerenes and methods of making same.

The discovery in 1985 of a new form of carbon, the pure carbon cage molecule $C_{60}$, known as the "Bucky Ball" or [Buckminster]fullerene, initiated a new class of materials. In its molecular form $C_{60}$ is a highly spherical hollow cage molecule with the carbon atoms in the shell arranged in a network of pentagons and hexagons. In the experimentally observed and energetically most favorable "soccer ball" configuration, all twelve pentagons are isolated. Since $C_{60}$ is the smallest fullerene obeying the isolated pentagon rule, there were questions about the stability of smaller pure carbon cage molecules formed from pentagons and hexagons since they must necessarily contain adjacent pentagons with a resultant large energy strain. Subsequently, a number of different size fullerenes have been synthesized in small amounts.

Under appropriate nonequilibrium growth conditions, carbon atoms form relatively stable hollow clusters of well-defined mass number, collectively known as fullerenes. The mass production of these clusters, and their purification and condensation into a solid are essential to full characterization and utilization of these new materials. While gas phase experiments indicate a wide range of fullerenes, beyond $C_{60}$ only a few pure fullerene solids have been obtained, notably $C_{70}$.

Lower mass fullerenes are of particular interest because their high curvature and increased energy strain owing to adjacent pentagon rings could lead to solids with unusual intermolecular bonding and electronic properties. These structures are expected to display chemical, electronic, magnetic and mechanical properties significantly different from, and possibly technologically more important than the more conventional $C_{60}$ fullerenes.

SUMMARY OF THE INVENTION

Accordingly, it is an object of the invention to provide a solid state carbon material formed of fullerenes based on thirty six carbon atoms ($C_{36}$).

It is also an object of the invention to provide a method for making a solid state carbon material from $C_{36}$ fullerenes.

It is another object of the invention to provide an improved method for making fullerenes with enhanced $C_{36}$ yield.

It is a further object of the invention to provide other related materials based on $C_{36}$ fullerenes.

The invention is a solid phase or form of carbon based on fullerenes with thirty six carbon atoms ($C_{36}$). $C_{36}$ is a stable carbon cage molecule. The $C_{36}$ structure with $D_{6h}$ symmetry is one of the two most energetically favorable, and is conducive to forming a periodic system. The lowest energy crystal is a highly bonded network of hexagonal planes of $C_{36}$ subunits with AB stacking. Electron diffraction indicates that $C_{36}$ forms a closed packed solid with a lattice constant significantly smaller than the $C_{60}$ counterpart. In contrast to solids formed from $C_{60}$ and higher order fullerenes, the $C_{36}$ solid is not a purely van der Waals solid, but has covalent-like bonding, leading to a solid with enhanced structural rigidity. The solid fullerene material may be termed a fullerite.

The invention includes the method of making the solid $C_{36}$ material by synthesizing and selecting out $C_{36}$ fullerenes in relatively large quantities. A $C_{36}$ rich fullerene soot is produced in a helium environment arc discharge chamber by operating at an optimum helium pressure (400 torr). The $C_{36}$ is separated from the soot by a two step process. The soot is first treated with a first solvent, e.g. toluene, to remove the higher order fullerenes but leave the $C_{36}$. The soot is then treated with a second solvent, e.g. pyridine, which is more polarizable than the first solvent used for the larger fullerenes. The second solvent extracts the $C_{36}$ from the soot. Thin films and powders can then be produced from the extracted $C_{36}$.

The invention also includes other materials based on $C_{36}$ fullerenes, providing for different properties. The smaller size of $C_{36}$ compared to $C_{60}$, and the higher percentage of 5-membered rings, make $C_{36}$ more reactive. Therefore other atoms can be attached to the carbon atoms in the $C_{36}$ molecules. For example, the $C_{36}$ fullerene can be coated with F or Cl to make Teflon-like balls. Also, some of the carbon atoms can be substituted with other elements, e.g. nitrogen, which shortens some of the C—C bonds. In addition, the $C_{36}$ fullerene cages can trap a range of atoms. Endohedral binding energies indicate that $C_{36}$ may be the smallest fullerene which can easily trap a range of atoms. For the lowest energy solid, sodium appears to be the largest alkali atom that can be intercalated into the crystal structure without causing severe structural distortion.

BRIEF DESCRIPTION OF THE DRAWINGS

In the accompanying drawings:

FIG. 1 is a mass spectrum of an arc discharge carbon soot film grown at 400 torr helium.

FIG. 2 shows an arc chamber apparatus for producing $C_{36}$ fullerenes.

FIG. 3 is a mass spectrum of the product resulting from the $C_{36}$ purification of a carbon soot material produced according to the invention.

FIG. 4 shows an extractor for extracting $C_{36}$ under inert conditions.

FIGS. 5A, B are theoretical and observed NMR spectra of $C_{36}$.

FIGS. 6A, B show the structures of the $D_{6h}$ and $D_{2d}$ $C_{36}$ molecules.

FIGS. 7A, B respectively show a top view of the repeating planes and a side view showing the relaxed interlayer bonding for the AB stacking sequence.

FIGS. 7C, D respectively show a top view of the repeating planes and a side view showing the relaxed interlayer bonding for the ABC stacking sequence.

FIG. 8A shows a top view of a planar bonded layer of $C_{36}$ units (S2 sheet).

FIGS. 8B–D show side views of relaxed crystal structures formed by stacking S2 layers according to AA, AB, or ABC sequences respectively.

FIG. 9A shows a $C_{24}N_{12}$ fullerene molecule.

FIG. 9B shows a $D_{6h}\ C_{36}\ Cl_{12}$ molecule.

DETAILED DESCRIPTION OF THE INVENTION

A. Preparation of $C_{36}$ Fullerenes

Bulk quantities of $C_{36}$ fullerenes are produced by a modified Kratschmer-Huffman arc plasma technique. The technique has been modified to enhance the production of $C_{36}$. The graphite arc soot produced by a carbon arc discharge under normal conditions contains fullerenes of different mass, particularly $C_{60}$ and other higher order fullerenes. Very little, if any, of the lower order fullerenes are produced. However, as a part of the invention, it has been determined that under certain conditions, $C_{36}$ can be produced in relatively large amounts, e.g. 1–2% of the carbon soot.

Optimum parameters for $C_{36}$ production were determined in a helium environment arc discharge chamber originally designed for $C_{60}$ production. An arc was started between two ¼ inch diameter graphite electrodes, using DC current of 100 A while maintaining a 1 mm gap between the electrodes. Arcing was maintained for several minutes until a uniform carbon film of about 10 μm thickness of the graphite arc soot was deposited on a substate placed 10 cm from the discharge region on the wall of the water cooled chamber.

The mass spectrum of an arc discharge carbon soot film grown in 400 torr helium is shown in FIG. 1. The dominant peaks are at 720 and 432 atomic mass units (amu), which correspond to 60 carbon atoms and 36 carbon atoms respectively. The $C_{36}$ and $C_{60}$ peaks are of comparable magnitude and these molecular species appear to be the most prominent in the sample. Lesser peaks are also observed, e.g. at 840 amu ($C_{70}$).

The synthesis of $C_{36}$ is very sensitive to operational parameters, notably helium pressure. A series of experimental runs was carried out at different fixed static helium pressures between 50 and 1500 torr. Runs in the series at pressures significantly different from 400 torr failed to produce prominent peaks below 720 amu in the mass spectrum. To produce bulk amounts of $C_{36}$ suitable for purification, arcing runs in 400 torr helium were repeated and the resulting soot was collected from the chamber walls.

To prevent exposure of the $C_{36}$ to air prior to purification (which affects its solubility) an arc chamber 10, shown in FIG. 2, was designed which could be transferred into an argon glovebox prior to opening. Arc chamber 10 has an inner chamber 12 where the arc takes place and an outer chamber 14 which is filled with a water cooling bath. Inner chamber wall 16 is mounted to outer chamber wall 18, e.g. at top flange 20. Water is flowed, through inlets/outlets 22, 24, through chamber 14 defined between walls 16, 18.

Positive electrode (anode) 26 is mounted on and extends through cover 28 into chamber 12. To eliminate a similar other electrode, grounded chamber wall 16, e.g. made of stainless steel, is used to ground a graphite plate 30 at the bottom of chamber 12. Thus graphite plate 30 acts as the cathode and provides a surface to arc the typically ¼ inch graphite anode 26 against. Anode 26 and chamber wall 16 are connected to a power supply 32 (e.g. DC or AC, 30–200 A, 0–70 V) to provide arc current, with wall 16 connected to the ground terminal 34.

Chamber 12 is connected through valve 36 to vacuum pump 38 to evacuate the system. Chamber 12 is also connected through valve 40 to a helium supply 42 which provides helium at the desired pressure. After the arc run, inner chamber 12 is removed from outer chamber 14, disconnected from pump 38 and helium supply 42, and transferred to an argon glovebox. Once inside the glovebox, inner chamber 12 is opened, and the soot is collected from wall 16.

B. Purification of $C_{36}$ Fullerenes

Once the carbon soot containing bulk quantities, e.g. 1–2%, of the $C_{36}$ fullerenes has been collected, the $C_{36}$ must be extracted or purified. A two step process is used. One particular process makes use of the different solubilities of the fullerenes.

While $C_{60}$ and the higher order fullerenes are soluble in toluene or benzene, $C_{36}$ is not. Therefore, the collected soot is initially washed in toluene in a standard Soxhlet extractor to remove the higher order fullerenes.

According to the invention, $C_{36}$ has been found to be soluble in both pyridine ($C_5H_5N$) and carbon disulfide ($CS_2$), two very polar organic solvents. Since the $C_{36}$ dissolves slowly in the solvents, because of its strong covalent bonding, heating and ultrasound can be used to assist in obtaining a saturated solution.

Therefore, the toluene insolvent residue left in the extractor after removal of the higher order fullerenes is further processed with pyridine as the extracting solvent. The pyridine soluble extract ($C_{36}$) forms a yellow-brown solution while the toluene soluble extract ($C_{60}$, $C_{70}$) forms a red-brown solution. After evaporating the pyridine from the pyridine soluble extract, bulk solid $C_{36}$ material (powder) was produced.

As an alternative to the wet chemistry dual solvent purification method, the second step, i.e. the removal of the $C_{36}$ from the remaining toluene insoluble material, can be done by thermal evaporation (sublimation purification). After the first step of toluene solvent extraction, the toluene insoluble material was dried in vacuum at 150 C for two hours and placed in the tungsten boat of a thermal evaporator. The evaporator boat was heated under a pressure of less than 1 μtorr, ultimately reaching a temperature of more than 1500 C. In about 20 minutes, films of about 100 nm thickness were deposited on a metal substrate suspended about 5 cm over the boat.

A mass spectrum of the material purified from the toluene insoluble extract of the carbon arc soot is shown in FIG. 3. The spectrum shows a single peak at 36 carbon atoms and no signal in the higher mass end of the spectrum, indicating that the material is composed of $C_{36}$ molecules.

An extractor 50 to extract fullerenes from graphite arc soot under inert conditions is shown in FIG. 4. Extractor 50 has a main tube 52 and a side tube 54 connected between the top and bottom of the main tube 52. The major modification in the extractor 50 is the inclusion of high vacuum Teflon stopcocks 56, 58 at the bottom and in the side tube. Water jacket 60 also surrounds main tube 52, reducing its length. A coarse frit 62 is placed across the main tube 52. The top of the extractor 50 is a female fitting 64 and the bottom is a male fitting 66.

C. Crystal Structure

The purified solid $C_{36}$ material obtained was characterized using C-13 NMR, bulk electron diffraction, mid-infrared transmission, and solid state transport studies. For a 36 atom carbon cage with hexagonal and pentagonal faces, 15 different isomeric structures are theoretically possible. Calculations indicate that the lowest energy isomers are structures with $D_{6h}$ and $D_{2d}$ symmetry. These two molecules can be distinguished by NMR spectroscopy. Mass spectrometry using a laser desorption/time of flight mass spectrometer shows that the material is $C_{36}$, as shown in FIG. 3.

FIG. 5A shows the predicted molecular NMR spectra for the isolated $D_{6h}$ and $D_{2d}$ isomers (along with schematic structure drawings). FIG. 5B shows the observed NMR spectrum for $C_{36}$ powder, obtained using a Chemagnetics 500 MHz instrument with magic-angle spinning. Taking into account broadening and shielding effects, the experimental spectrum suggests $D_{6h}$ symmetry for the $C_{36}$ molecule.

The 36 atom carbon clusters lie in an interesting size regime, intermediate between the closed cage fullerene (N=40–90) and ring (N=10–28) dominated sizes. Six distinct equilibrium structures have been considered: the $D_{6h}$, $D_{2d}$, $C_{2v}$, and $D_{3h}$ fullerenes; a $C_{3v}$ corranulene-like bowl; and a $D_{18d}$ monocyclic ring. Eleven other fullerenes structures are theoretically possible but very unlikely to form due to excessive pentagon clustering. The $D_{6h}$ and $D_{2d}$ fullerenes are predicted to be the most energetically favorable and stable.

The $D_{6h}$ $C_{36}$ structure, shown in FIG. 6A, is the most preferred since it has the higher symmetry and can form simple solids. In the $D_{6h}$ structure, the pentagons form two belts around the top and bottom hexagons, and there is a row of hexagons separating these pentagon belts. The relaxed $D_{6h}$ $C_{36}$ structure has a height of 5.2 Å and a width of 4.9 Å as measured from the atomic positions. The symmetry unique or inequivalent atoms C1, C2, C3 are labelled in FIG. 6A.

The $D_{2d}$ $C_{36}$ structure, shown in FIG. 6B, is also preferred.

The solid state materials formed of the $C_{36}$ fullerenes may have a hexagonal or rhombohedral crystal structure with the hexagonal structure being most preferred. The crystal with hexagonal symmetry is substantially lower in energy, and has different electronic properties. Electron diffraction was used to investigate the crystal structure of solid $C_{36}$. A small amount of solid $C_{36}$ was ground up, dispersed on a holey carbon grid, and inserted into a JEOL 200X transmission electron microscope (TEM). The material was observed to be polycrystalline with a grain size of about 100 nm. The TEM diffraction pattern was hexagonal, suggesting a close packing arrangement perpendicular to the zone axis. The calculated d-spacing was 6.68 Å.

The hexagonal and rhombohedral crystal symmetries are shown in FIGS. 7A–D. Each is formed by stacking hexagonally symmetric planes of well separated $C_{36}$ units. FIGS. 7A–D show two kinds of stacking sequences, AB and ABC, corresponding to the hexagonal and rhombohedral crystals respectively. FIGS. 7A, B respectively show a top view of the repeating planes and a side view showing the relaxed interlayer bonding for the AB stacking sequence. FIGS. 7C, D respectively show a top view of the repeating planes and a side view showing the relaxed interlayer bonding for the ABC stacking sequence. The fundamental stacking unit is a plane of unbonded $C_{36}$ molecules referred to as sheet 1 (S1) and the two crystals are labelled S1-AB and S1-BC for the two kinds of stacking. The $C_{36}$ units are essentially noninteracting within an S1 sheet. (The AA stacking sequence (S1-AA) is not considered because it does not form a metastable structure.)

The $D_{6h}$ $C_{36}$ molecules form stable dimers and trimers with two or six intermolecular bonds respectively. Further $C_{36}$ molecules may be added in the same manner to form a sheet of bonded units referred to as sheet 2 (S2). Different crystal structures may also be formed by stacking S2 layers.

FIG. 8A shows a top view of a planar bonded layer of $C_{36}$ units (S2 sheet), and FIGS. 8B–D show side views of relaxed crystal structures formed by stacking S2 layers according to AA, AB, or ABC sequences respectively.

For S2-AA there is bonding between all six carbon atoms of the hexagon rings on top and bottom, as in the case of S1-AB. Stacking S2 sheets in the AB sequence results in a slightly larger density and a substantially larger binding energy than S2-AA. It is the lowest energy crystal structure. The S2-ABC contains no interlayer bonding and is not likely to be stable.

The $C_{36}$ solid is not a purely van der Waals solid, but has covalent bonding which produces a solid with enhanced structural rigidity.

D. Properties and Related Compounds

Because of its higher curvature and greater percentage of pentagons, the $C_{36}$ is more reactive than $C_{60}$. Thus it can produce compounds. Because of the covalent bonding of the solid material, very hard polymerized solids are formed. Also because of the high curvature, the electron-phonon coupling is enhanced, leading to high superconducting transition temperatures.

The related materials based on $C_{36}$ fullerenes include (1) substitutional doping of carbon atoms on the fullerene cages by electron donors and acceptors such as N or B; (2) addition of other atoms, e.g. halogens, to the carbon atoms; and (3) endohedral doping of the fullerene molecules. All of these may significantly change the properties of the material.

Several N substitutionally doped $C_{36}$ $D_{6h}$ cages have been considered: $C_{34}N_2$, $C_{28}N_8$, and $C_{24}N_{12}$. In all cases no two dopant atoms are placed next to one another since the strong nitrogen dimer bond would weaken the overall structure. The most symmetric configurations are the most energetically favorable. The highest symmetry case is $C_{24}N_{12}$, shown in FIG. 9A, which retains the full $D_{6h}$ symmetry. The substitution of N atoms for C atoms in the cage changes the properties of the material, e.g. the C—C bonds across the hexagon belt a shortened by about 10%.

Thus the invention encompasses $C_{36}$ fullerene materials where the material has the more general formula $C_{36-a}X_a$, where X is the doping atom, e.g. N or B, and $0 \leq a \leq 12$.

Other atoms can also be added to the $C_{36}$ fullerene by binding to the carbon atoms in the cage. For example, the $C_{36}$ fullerenes may be halogenated, eg. fluorinated or chlorinated. The $D_{6h}$ $C_{36}Cl_{12}$ molecule is shown in FIG. 9B.

The invention also includes endohedrally doped fullerenes and intercalated solids. An atom M may be placed in the center of a $C_{36}$ molecule (M@ $C_{36}$). Binding energy calculations show that endohedral doping of $C_{36}$ with alkali earth atoms Mg, Ca, and Sr, and also with Si, Ge, and Zr, is possible. The $C_{36}$ fullerene appears to be the smallest size carbon cage which can easily trap additional atoms. As far as intercalation into the solid material, the S2-AB crystal structure has two cavities per $C_{36}$ which can be doped with other atoms, e.g. Na or K. However, because of the ionic radiuses, Na appears to fit well but K causes structural changes.

Changes and modifications in the specifically described embodiments can be carried out without departing from the scope of the invention which is intended to be limited only by the scope of the appended claims.

What is claimed is:

1. A composition of matter comprising a solid state material consisting essentially of $C_{36}$ fullerene molecules.

2. The composition of claim 1 wherein the solid state material has a crystalline structure.

3. The composition of claim 2 wherein the crystalline structure is hexagonal.

4. The composition of claim 1 wherein the molecules are covalently bonded to each other.

5. An article of manufacture comprising a coating formed of a solid state $C_{36}$ material.

6. A method of making a solid state $C_{36}$ fullerene material, comprising:
   producing $C_{36}$ rich graphite arc soot;
   removing higher order fullerenes from the soot, leaving a $C_{36}$ containing residue;
   removing the $C_{36}$ from the residue;
   producing a solid material from the $C_{36}$ removed from the residue.

7. The method of claim 6 wherein the $C_{36}$ rich soot is produced by operating a carbon arc discharge in a helium atmosphere at about 400 torr pressure.

8. The method of claim 6 wherein the higher order fullerenes are removed using a first solvent and the $C_{36}$ is removed using a second solvent.

9. The method of claim 8 wherein the first solvent is toluene and the second solvent is pyridine.

10. The composition of claim 1 wherein the solid state material is in the form of a film or a powder.

* * * * *